L. DE FLOREZ.
OPTICAL INSTRUMENT.
APPLICATION FILED JULY 14, 1916.

1,264,374.

Patented Apr. 30, 1918.

Luis de Florez  Inventor

By his Attorneys
Sheffield & Betts

UNITED STATES PATENT OFFICE.

LUIS DE FLOREZ, OF SHORT HILLS, NEW JERSEY.

OPTICAL INSTRUMENT.

1,264,374.  Specification of Letters Patent.  Patented Apr. 30, 1918.

Application filed July 14, 1916. Serial No. 109,247.

*To all whom it may concern:*

Be it known that I, LUIS DE FLOREZ, a citizen of the United States, residing at Short Hills, in the county of Morris and State of New Jersey, have invented certain new and useful Improvements in Optical Instruments, of which the following is a description.

My invention relates to the variation of the index of refraction of a transparent object, such as a prism, by varying the density of a medium contained within the transparent object, or by varying the density of a surrounding medium if it be a solid transparent object. By thus varying the density of either medium, as above, I effect a change in the index of refraction, since light traveling through a more or less dense medium than the one previously traversed is refracted.

This variation in the refractive index may be indicated by noting the difference in pressure as shown by a pressure gage, manometer, or any other form of pressure registering device in conjunction with a chart so calibrated as to show the change in the refractive index corresponding to a change in pressure, as read on the pressure registering device. The change in the index of refraction may in this way be used as a measurement of angles.

All prior optical instruments, such as range finders, etc., depend upon an angularly adjustable prism to reflect the image of a distant object upon another image of the same object formed my another prism separated from the angularly adjustable prism by a known distance along a reference line called the "base" line as in the "One Man Range Finder" as used in military field operations. The rotation given to the angularly adjustable prism is hence a measure of the desired angle.

An object of my invention is to measure angles by the variation of the refractive index. These angles may then be used in trigonometric formulæ to compute distances.

For a full understanding of the invention, reference is to be had to the following description and accompanying drawings, in which.

Figure 1:
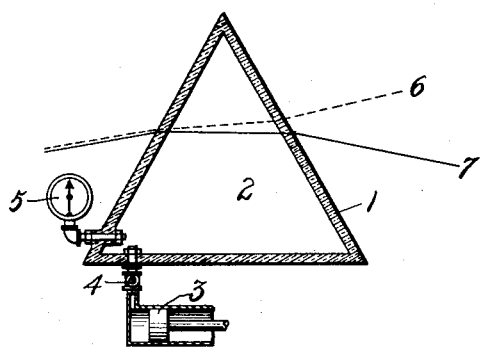
Figure 1 illustrates one form of my invention in which a hollow prismoidal container is used.

Referring to Fig. 1, I have shown at 1 a container of a generally prismoidal form which may be formed of glass or other transparent material and is hollow so as to contain a medium 2. This medium may be any suitable fluid and is to have its pressure varied by means of a pump shown diagrammatically at 3. The pump operates to force the fluid through a hand operated valve 4. A gage 5 is connected with the interior of 1 to indicate the pressure of the medium contained therein.

As explained above, by varying the pressure of medium 2 the index of the refraction of the apparatus is changed and the change of index being a function of the pressure the angle may be determined by reference to the gage 5.

I have illustrated at 6 the path of a ray of light through the apparatus of Fig. 1 when the medium 2 is a rarefied medium and at 7 a ray of light when the medium is dense.

Figure 2:
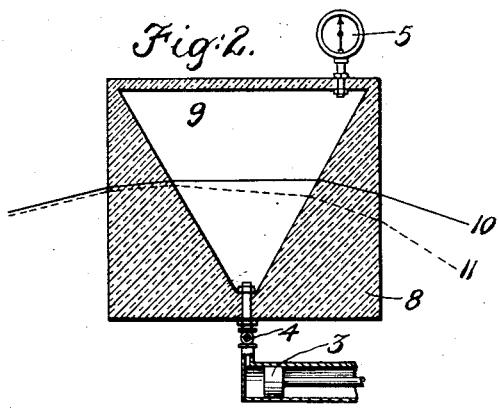
Fig. 2 illustrates a modification of my invention in which a rectangular container is used.

In Fig. 2 the container 8 is rectangular in shape but has a hollowed out portion 9 which is adapted to contain the medium 2. Connected with the hollowed out portion is the pump 3, hand operated valve 4 and gage 5 as in the modification shown in Fig. 1. This modification presents certain advantages over that shown in Fig. 1 by reason of its structure. The construction being a stronger one than that shown in Fig. 1 and the pressures to which the apparatus may therefore be subjected greater.

I have shown at 10 the path of a ray of light through the modification of Fig. 1 if the medium contained therein be a dense medium, and at 11 the path of a ray of light by a rarefied medium.

Figure 3:
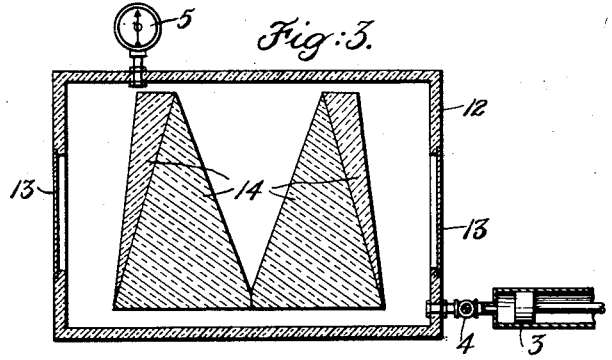
Fig. 3 shows a modification of my invention in which a rectangular container having one or more solid prismoidal bodies contained therein is used.

In Fig. 3 I have shown a further modification of my device which comprises a container 12 of any convenient shape which may or may not be transparent, as desired. If it is not transparent I provide two glazed or otherwise transparent apertures 13 through which the light may penetrate. Included in the container 12 is one or more generally prismoidal refractors 14 which are immersed in the medium 2, supplied by the pump 3, through the hand operated valve 4, as in the other modifications.

In the modification of Fig. 3 therefore I have shown the means of varying the refraction by varying density of the surrounding medium instead of varying the refraction of the medium itself as in modification shown in Figs. 1 and 2.

It will be seen that I may increase the pressure of the compressible medium associated with the transparent solid by adjusting the position of the pump piston until the angle of the light ray has been adjusted as desired, within certain limits, whereupon the corresponding pressure may be noted on the gage. The valve 4 may then be closed to hold the pressure at the same point as long as desired. It will be seen moreover, that when the valve 4 is open the pressure of the compressible medium may be either raised or lowered by correspondingly changing the position of the pump piston 3.

It will be obvious to those skilled in the art that many changes may be made without departing from the scope of my invention and I, therefore, do not intend to confine myself to the modifications shown herein.

What I claim is:

1. Means for producing a refraction of light and means associated therewith whereby the index of refraction of the said means may be varied.

2. Means for varying the refraction of light which comprises means for varying the density of the medium through which the light passes.

3. Means for producing a refraction of light, a medium associated therewith and means for producing a change in the density of the medium whereby the index of refraction therethrough is varied.

4. Means for producing a refraction of light comprising a transparent prismoidal member, a medium associated therewith and means for varying the density of said medium whereby the refractive index of said transparent member is changed.

5. Means for producing a refraction of light comprising a transparent prismatic member, a medium associated therewith, means for varying the density of said medium whereby the index of refraction of said transparent member is changed and means for registering the pressure of said medium.

6. Means for producing refraction in a transparent container, a medium contained therein and means for varying the density of the medium contained within the container whereby the index of refraction of light passing through the container is changed.

7. The combination with a transparent solid of a medium associated therewith, said medium and solid being relatively so arranged that rays of light pass through them in turn, and means for varying the density of said medium at will to change the index of refraction.

8. The combination with a transparent solid having a cavity therein, a medium within said cavity through which the light passes, and means whereby the density of said medium may be varied to change the index of refraction.

LUIS DE FLOREZ.